(12) United States Patent
Heller et al.

(10) Patent No.: US 7,257,913 B2
(45) Date of Patent: Aug. 21, 2007

(54) LOUVER AND CLIP FOR A ROTATIONAL SIGN

(75) Inventors: Todd Heller, Marietta, GA (US); Richard Wanser, Lithum, GA (US); Dewey Pitts, Marietta, GA (US)

(73) Assignee: Ad-Tech International, Inc., Atlanta, GA (US)

( * ) Notice: Subject to any disclaimer, the term of this patent is extended or adjusted under 35 U.S.C. 154(b) by 244 days.

(21) Appl. No.: 11/155,383

(22) Filed: Jun. 17, 2005

(65) Prior Publication Data

US 2006/0283063 A1  Dec. 21, 2006

(51) Int. Cl.
G09F 7/00 (2006.01)
G09F 11/02 (2006.01)
F16B 12/00 (2006.01)
A47F 3/00 (2006.01)
A44B 1/04 (2006.01)
A41F 1/00 (2006.01)
B23Q 1/48 (2006.01)

(52) U.S. Cl. .................... 40/503; 40/596; 40/506; 40/611.12; 40/611.11; 312/111; 312/140; 24/462; 24/545; 403/381

(58) Field of Classification Search .................. 40/596, 40/503, 607.12, 505, 502, 506, 611.12, 611.11; 24/462, 545; 312/111, 140; 403/381
See application file for complete search history.

(56) References Cited

U.S. PATENT DOCUMENTS

| 559,506 A | * | 5/1896 | Swain ..................... 269/93 |
|---|---|---|---|
| 2,389,897 A | * | 11/1945 | Davis ..................... 40/209 |
| 4,780,001 A | | 10/1988 | Werner |
| 5,161,421 A | | 11/1992 | Stigsson |
| 5,416,996 A | | 5/1995 | Clemens et al. |
| 5,560,131 A | * | 10/1996 | Gibson .................. 40/607.12 |
| 6,076,293 A | | 6/2000 | Bergeron |
| 6,256,912 B1 | | 7/2001 | Gibson et al. |
| 6,295,882 B1 | | 10/2001 | Osterberg |
| 6,354,028 B1 | | 3/2002 | Gross et al. |
| 6,422,286 B1 | | 7/2002 | Osterberg |
| 6,434,868 B1 | | 8/2002 | Bergeron |
| 2004/0064987 A1 | | 4/2004 | Bihr |
| 2006/0101683 A1 | * | 5/2006 | Baker ..................... 40/503 |

\* cited by examiner

*Primary Examiner*—S. Joseph Morano
*Assistant Examiner*—Syed A. Islam
(74) *Attorney, Agent, or Firm*—Jason A. Bernstein; Charles L. Warner, II; Powell Goldstein LLP

(57) ABSTRACT

A signage system comprising a prism-shaped tri-panel louver having a slot at each corner into which can be slid a clip. The clip is generally V-shaped with a pair of opposing sides joined at one end to form an apex. At the apex end is a pair of opposing fingers which are generally parallel to the clip sides. The fingers form a slot on each side. The clip is slid and retained by a friction fit within the slot such that when three clips are installed the fingers and slots formed therein can hold the sign graphics strip. The clip can flex somewhat to allow for insertion in a slot in the louver.

4 Claims, 5 Drawing Sheets

LOUVER AND CLIP FOR A ROTATIONAL SIGN

FIELD OF THE INVENTION

The present invention relates to tri-panel louvered rotational display signage, and, more particularly, to a clip that slides into a corner of the louver and holds a strip of advertising signage.

BACKGROUND OF THE INVENTION

Tri-panel rotating display signs have been used for a number of years as a technique to increase the amount of effective signage space from a generally flat panel signage display apparatus. These displays use a set of prism-shaped elongated louvers which are attached to a drive motor and gear so that the louvers rotate together. Each louver has three faces to which are attached or adhered a strip of material, commonly vinyl or other known material, which has sign graphics printed thereon or attached thereto. Each time the composite advertisement is to be replaced, each strip on one or more faces of the louver must be replaced.

One attachment method is the application of adhesive vinyl directly on the louvers. To accomplish this sometimes all of the louvers needed to be removed from the sign, laid out on a rack, then the adhesive vinyl is applied and the louvers reinstalled. Often in warmer climates a skilled person hangs in front of the sign from a scaffold or rig and applies the adhesive vinyl directly on the louver in the sign. Both application methods require the vinyl to be cut for the gaps between the louvers so the louvers can rotate.

Another method of attaching the sign to the louver uses a changeable louver face. Made of extruded aluminum or PVC a louver face plate either snaps in or slides into a clip. These changeable louver face plates can have the advertising image adhesive vinyl applied to the face plates held in a rack or jig in a shop, then get numbered, packaged, delivered to the location of the sign, and hauled up to the sign. The existing louver face plates are removed via un-snapping or sliding out and the new advertising image changeable louver face plates are installed. Then the changeable louver face plates are recycled back to the shop cleaned ready for the next installation cycle.

Other louver and clip assemblies are commercially available from various manufacturers. It would be desirable to have a louver and clip assembly that would permit easy installation and deinstallation of signage strips without necessity of removal the louver itself.

SUMMARY OF THE INVENTION

In general, the present invention provides in one embodiment a signage system incorporating a prism-shaped tri-panel louver having a slot at each corner into which can be slid a clip. The clip is generally V-shaped with a pair of opposing sides joined at one end to form an apex. At the apex end is a pair of opposing fingers which are generally parallel to the clip sides. The fingers form a slot on each side. The clip is slid and retained by a friction fit within the slot such that when three clips are installed the fingers and slots formed therein can hold the sign graphics strip. The clip can flex somewhat to allow for insertion in a slot in the louver.

In one exemplary embodiment, the present invention provides a clip for holding a strip of advertising signage in a louver as part of a rotational sign, the clip comprising (a) a louver slot engaging first section comprising a V-shaped pair of opposing first and second sides joined at an apex and each having a distal end, a first portion extending from the first side distal end and angled inward, a second portion extending from the second side distal end and angled inward, a third portion extending from the first portion and angled outward for engaging the louver, a fourth portion extending from the second portion and angled outward for engaging the louver, a base fifth portion extending from the third portion and angled inward, a base sixth portion extending from the fourth portion and angled inward toward the base fifth portion such that the fifth and sixth portions are generally parallel and generally pointing toward each other; and, (b) a signage strip engaging portion comprising a seventh portion extending from the apex and generally parallel to the first side such that a first slot is defined between the seventh portion and the first side, an eighth portion extending from the apex and generally parallel to the second side such that a second slot is defined between the eighth portion and the second side.

Other features and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
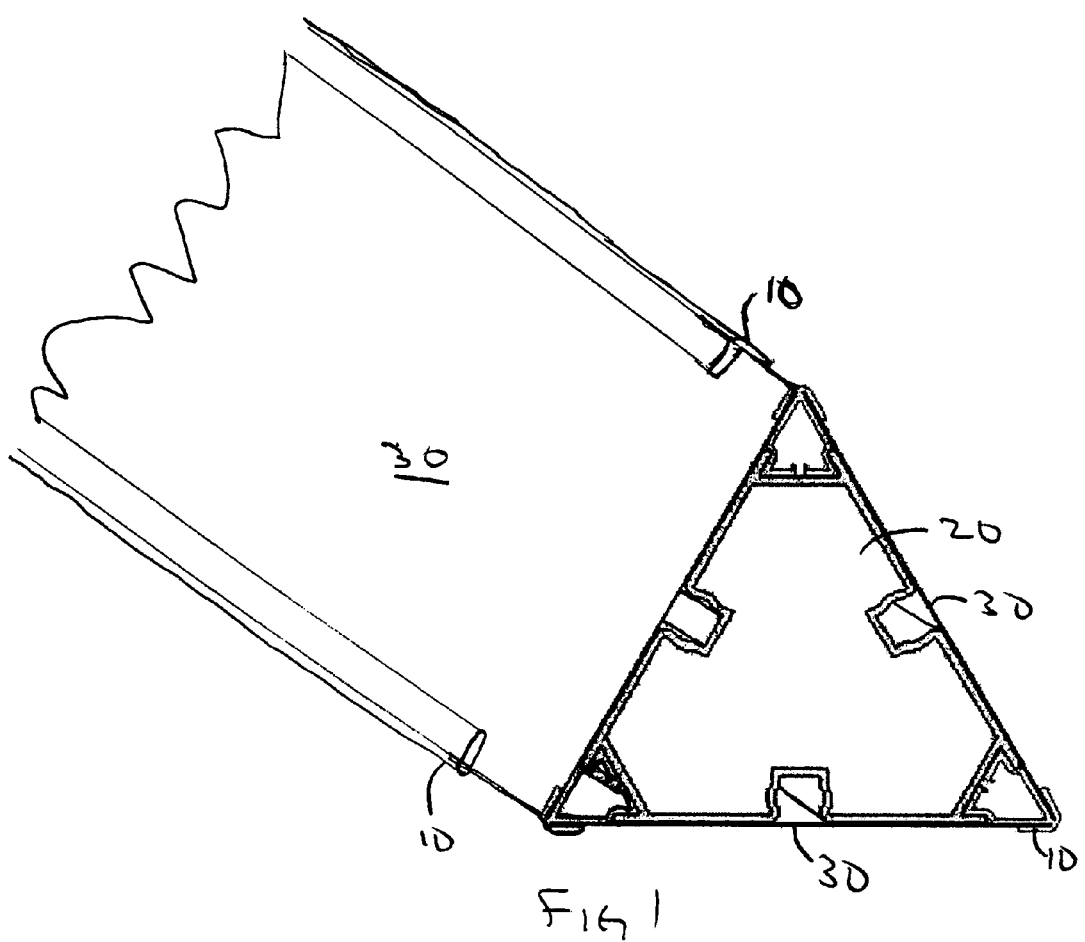
FIG. 1 is a perspective view of a clip according to one exemplary embodiment of the present invention as shown in place in a louver with a strip of advertising signage.

The present invention generally comprises, in one exemplary embodiment shown in FIG. 1, a clip 10 is removably disposed in one of three corner tracks in a louver 20. A strip of advertising signage 30 is engaged between two clips 10.

The clip 10 is generally an elongated strip of material, preferably plastic, but any suitable material, such as metal, polymer, cellulose, paper, cardboard, alloy, composite or mixtures or combinations thereof may be used. It is preferable that the clip be made of material that can withstand repeated and prolonged exposure to the outside elements and weather conditions, including sunlight, without appreciable deterioration or degradation. An ultraviolet light absorbing material, or other material, may be integrated or coated on the clip 10. It is preferable that the clip material permit at least a small degree of flexion, as will be discussed further hereinbelow. The clip 10 may be advantageously be made of plastic and formed by extrusion according to conventional methods known to those skilled in the art.

Figure 2:
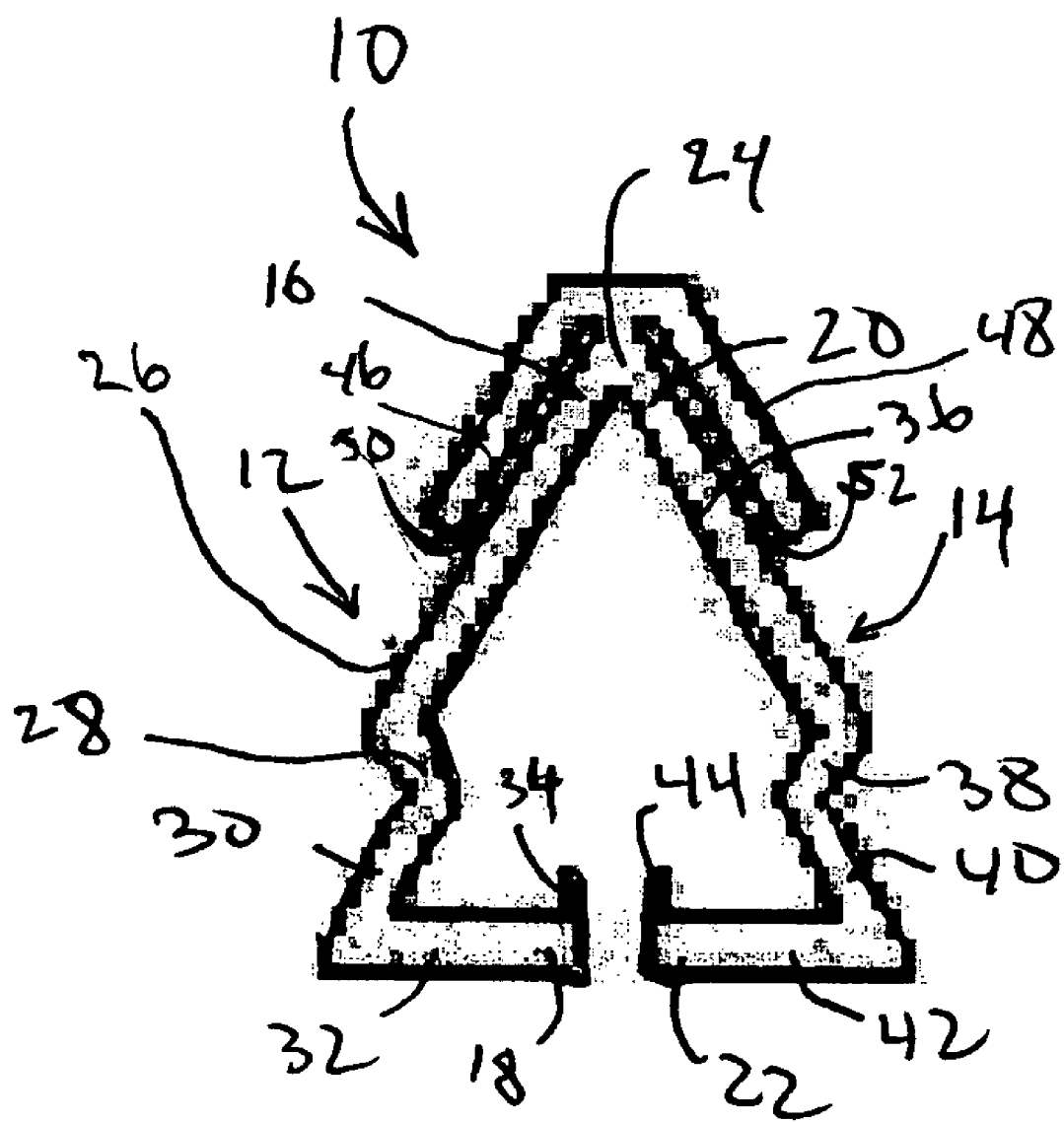
FIG. 2 is a cross-section view of a clip according to one exemplary embodiment of the present invention.
Figure 3:
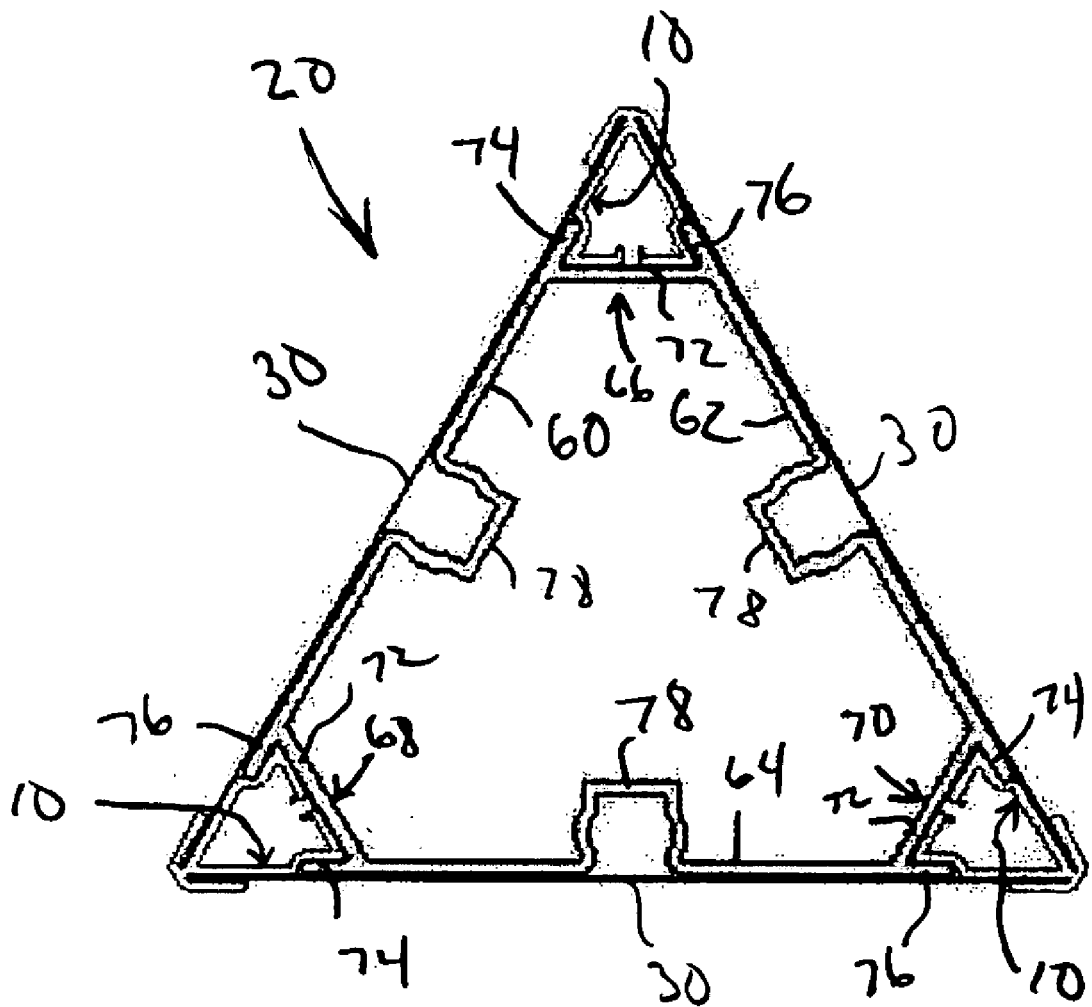
FIG. 3 is a cross-section view of the clip of FIG. 1 shown disposed in a louver track.
Figure 4:
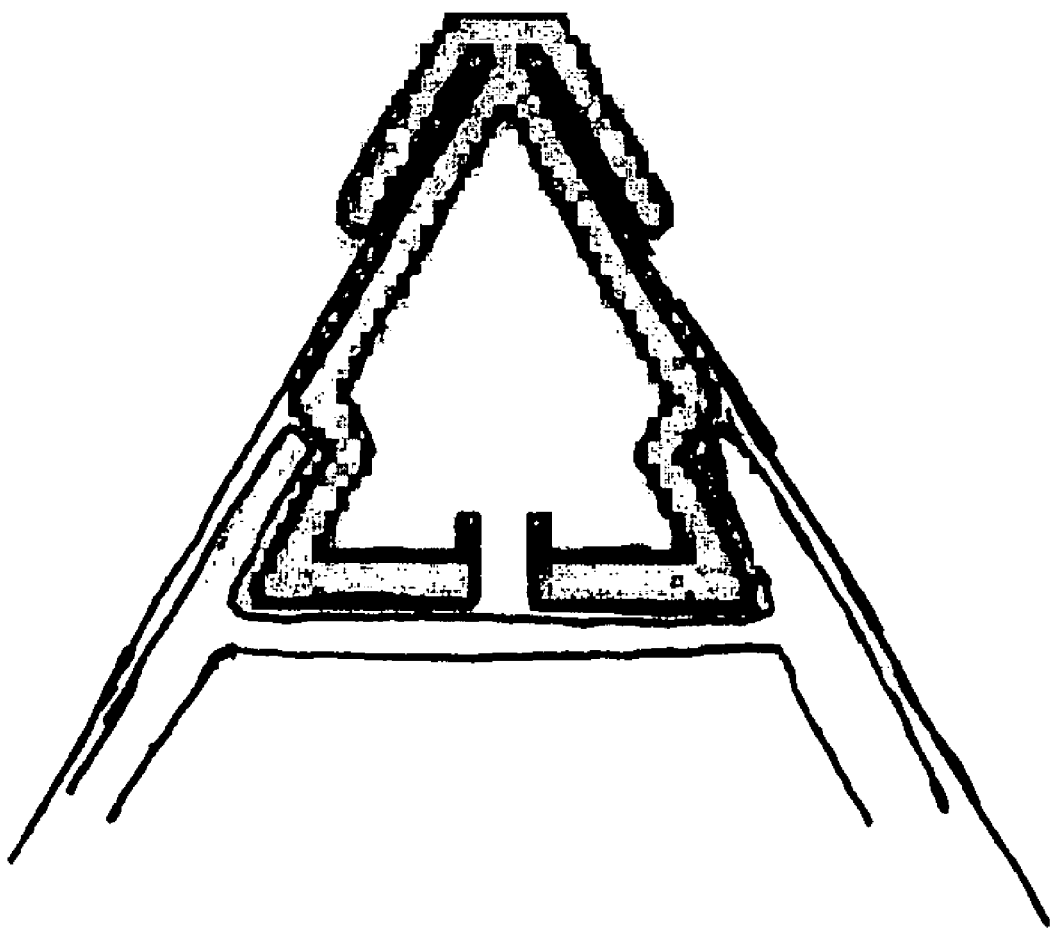
FIG. 4 is a detailed cross-section view of the clip of FIG. 3 shown disposed in a louver track with a strip of signage in place.

FIG. 2 shows a cross section detail view of the clip 10. The clip 10 comprises mirror image first half 12 and second half 14. The two halves can preferably flex slightly when squeezed together. The first half 12 has a first end 16 and a second end 18; the second half 14 has a first end 20 and a second end 22. The first end 16 and first end 20 are joined so that the halves 12, 14 form a V-shape having an apex 24.

The first half 12 has a first section 26 which is connected to an inwardly angled second section 28, which in turn is connected to an outwardly angled (and generally parallel to the first section 26) third section 30. The third section 30 is connected to a base fourth section 32, which optionally has a tab 34 extending from the second end 18.

In a similar fashion, mirror image second half 14 has a first section 36 which is connected to an inwardly angled second section 38, which in turn is connected to an outwardly angled (and generally parallel to the first section 36) third section 40. The third section 40 is connected to a base fourth section 42, which optionally has a tab 44 extending from the second end 22.

Extending from the apex 24 is a signage strip engaging portion comprising a first flap 46 and a second flap 48, the fingers being generally parallel to first sections 26, 36, respectively, thereby forming a first slot 50 and a second slot 52. Each slot 50, 52 can engage one edge of the signage strip 20.

The louver 20 comprises a three-sided elongated prism-shaped structure, preferably made of a generally rigid material, such as, but not limited to, extruded aluminum, polyvinyl chloride or other extrudable material. Alternatively, the louver 20 may be made of several sections and joined together. The louver 20 has a first side 60, second side 62 and third side 64, which join to form a first corner 66, second corner 68 and third corner 70. Each corner 66, 68, 70 has generally flat section 72 and, extending from one side of the flat section 72 there is a ledge 74 and from the other side there is a ledge 76. The ledges 74, 76 angle inwardly and point toward what would be an apex if the ledges were extended sufficiently far. Optionally, the each side 60, 62, 64 may have a slot 78 extending at least a portion of the length of the louver 20 for increased strength and water runoff.

In operation a clip 10 is slid into each corner 66, 68, 70 such that the second and third sections 28, 30 and 38, 40 respectively, form a ledge which mates with the ledge 74, 76, respectively. The clip can flex slightly so that the halves 12, 14 flex toward each other when the clip 10 is inserted so as to provide a friction fit and prevent the clip 10 from inadvertently sliding out of the louver corner 66, 68, 70. This arrangement also holds the clip 10 in a relative fixed location. The clip 10 is preferably slightly less in length than the louver 20 so that the strip 30 can be slid easily into place. The slot 50 is coplanar and generally parallel with an opposing slot 50 at another corner on the same side of the louver, thus forming a channel into which the signage strip 30 can be slid.

Figure 5:
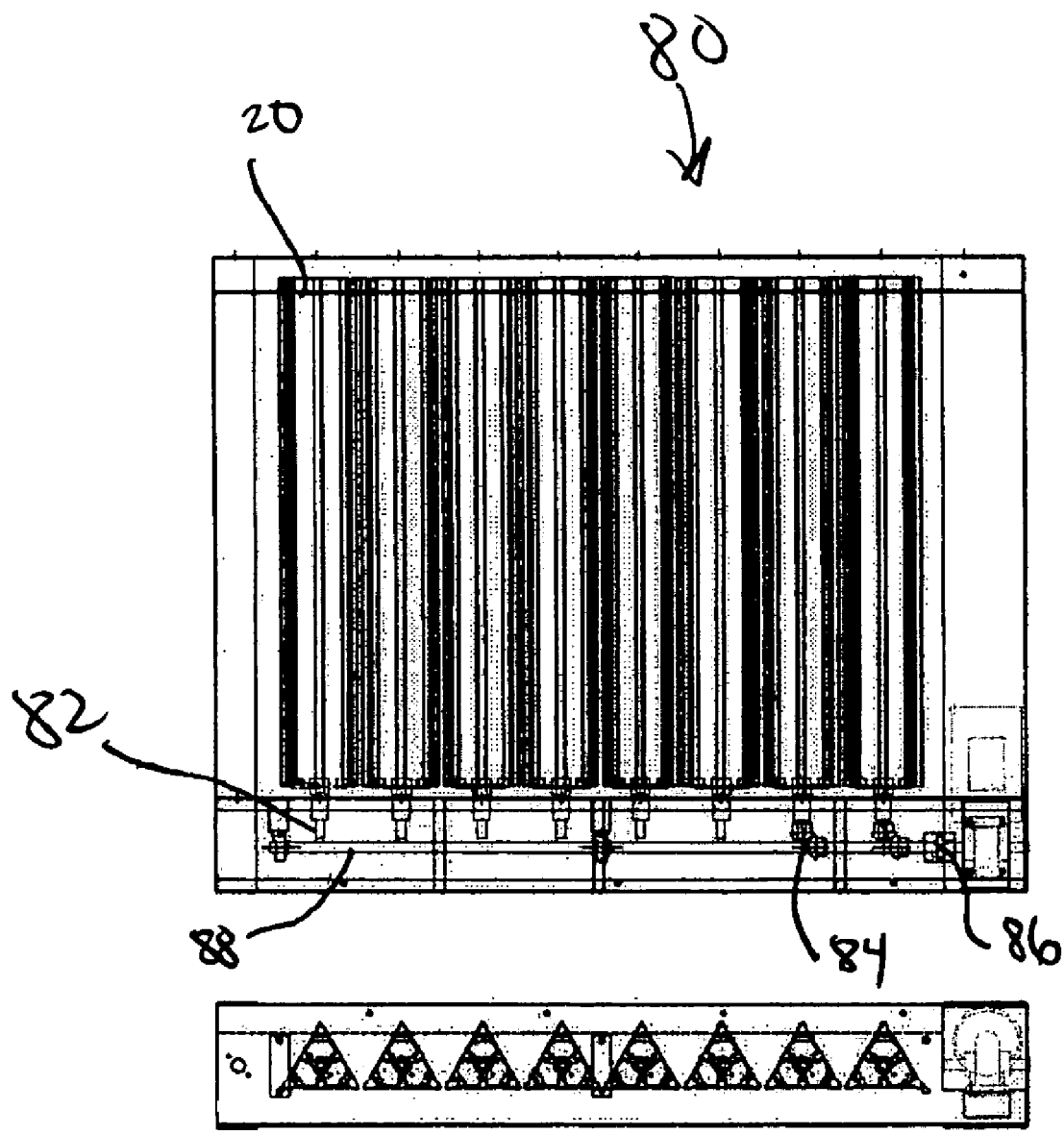
FIG. 5 is a front elevational schematic view of a display sign apparatus.

As shown in FIG. 5, the clip 10 and louver 20 assembly can be incorporated into a conventional tri-panel sign display apparatus 80, as are known in the art. Such a display apparatus 80 generally comprises a plurality of louvers 20, which are held in place at top and bottom by louver pivot assemblies 82. Commonly, a gear 84 is connected to each louver 20 and the gear is operatively connected to a drive motor 86 by a chain 88 or other connection mechanism. A controller 90 (not shown) is programmed to activate the drive motor 86 so that the louvers are turned one-third of an entire rotation at defined intervals. The apparatus 80 is contained within a housing 92. In this manner, signage displayed on each panel of the signage strip 30 is visible to the intended audience for the desired period. When the drive motor 86 is actuated, all louvers 20 are rotated generally simultaneously (although non-simultaneous rotation can be used for desired visual effects) so that the entire composite image formed by the strips 30 changes at the same time.

Advantages

An advantage of the present invention is the ability to install "slide in" low-cost advertising graphics which are printed vinyl sheets cut into strips, being held in place without adhesives, being disposable in nature. The clip 30 minimizes the size of the gap between louvers 20, eliminating the need to remove the louvers 20 or re-usable changeable face plates from the sign to change advertising images. Further, the present invention allows the graphics image to be printed directly on to the flat vinyl sheet. The packaging of the vinyl sheets are easily shipped to the sign location. The sheets can be slid into the assembly faster than traditional installation methods. This process may result in a reduction of the cost to change an advertising image on a 14 by 48 foot sign by up to nearly 50% or about $1,000.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

It should further be noted that any patents, applications and publications referred to herein are incorporated by reference in their entirety.

What is claimed is:

1. A clip for holding a strip of advertising signage in a louver as part of a rotational sign, said clip comprising:
  a) a louver slot engaging first section comprising
    i) a V-shaped pair of opposing first and second sides joined at an apex and each having a distal end,
    ii) a first portion extending from said first side distal end and angled inward,
    iii) a second portion extending from said second side distal end and angled inward,
    iv) a third portion extending from said first portion and angled outward for engaging said louver,
    v) a fourth portion extending from said second portion and angled outward for engaging said louver,
    vi) a base fifth portion extending from said third portion and angled inward,
    vii) a base sixth portion extending from said fourth portion and angled inward toward said base fifth portion such that said fifth and sixth portions are generally parallel and generally pointing toward each other; and,
  b) a signage strip engaging portion comprising
    i) a seventh portion extending from said apex and generally parallel to said first side such that a first slot is defined between said seventh portion and said first side,
    ii) an eighth portion extending from said apex and generally parallel to said second side such that a second slot is defined between said eighth portion and said second side.

2. The clip of claim 1, wherein said first and second sides have a degree of flexion with respect to each other so that said clip can be received in said louver and be retained by a friction fit.

3. The clip of claim 1, wherein said base fifth portion has a tab extending therefrom and said base sixth portion has a tab extending therefrom.

4. A louver and clip assembly for holding a strip of advertising signage a rotational sign, comprising:
  a) a louver generally comprising a first side, second side and third side, said sides joined to for a generally triangular cross sectional shape, said triangular shape having three corners, each said corner having
    i) a generally flat first section having a first corner and second corner,
    ii) a first lip extending from said first flat section first corner and generally parallel and generally coplanar with said first side,
    iii) a second lip extending from said flat first section second corner and generally parallel and generally coplanar with said second side; and,
  b) at least one clip removably engageable with said louver, said clip comprising
    i) a louver slot engaging first section comprising
      a) a V-shaped pair of opposing first and second sides joined at an apex and each having a distal end,
      b) a first portion extending from said first side distal end and angled inward,
      c) a second portion extending from said second side distal end and angled inward,
      d) a third portion extending from said first portion and angled outward for engaging said louver,
      e) a fourth portion extending from said second portion and angled outward for engaging said louver,
      f) a base fifth portion extending from said third portion and angled inward,
      g) a base sixth portion extending from said fourth portion and angled inward toward said base fifth portion such that said fifth and sixth portions are generally parallel and generally pointing toward each other; and,
    ii) a signage strip engaging portion comprising
      a) a seventh portion extending from said apex and generally parallel to said first side such that a first slot is defined between said seventh portion and said first side,
      b) an eighth portion extending from said apex and generally parallel to said second side such that a second slot is defined between said eighth portion and said second side.

\* \* \* \* \*